W. H. SAUVAGE.
SLACK ADJUSTER.
APPLICATION FILED JAN. 25, 1916.
1,227,946.
Patented May 29, 1917.
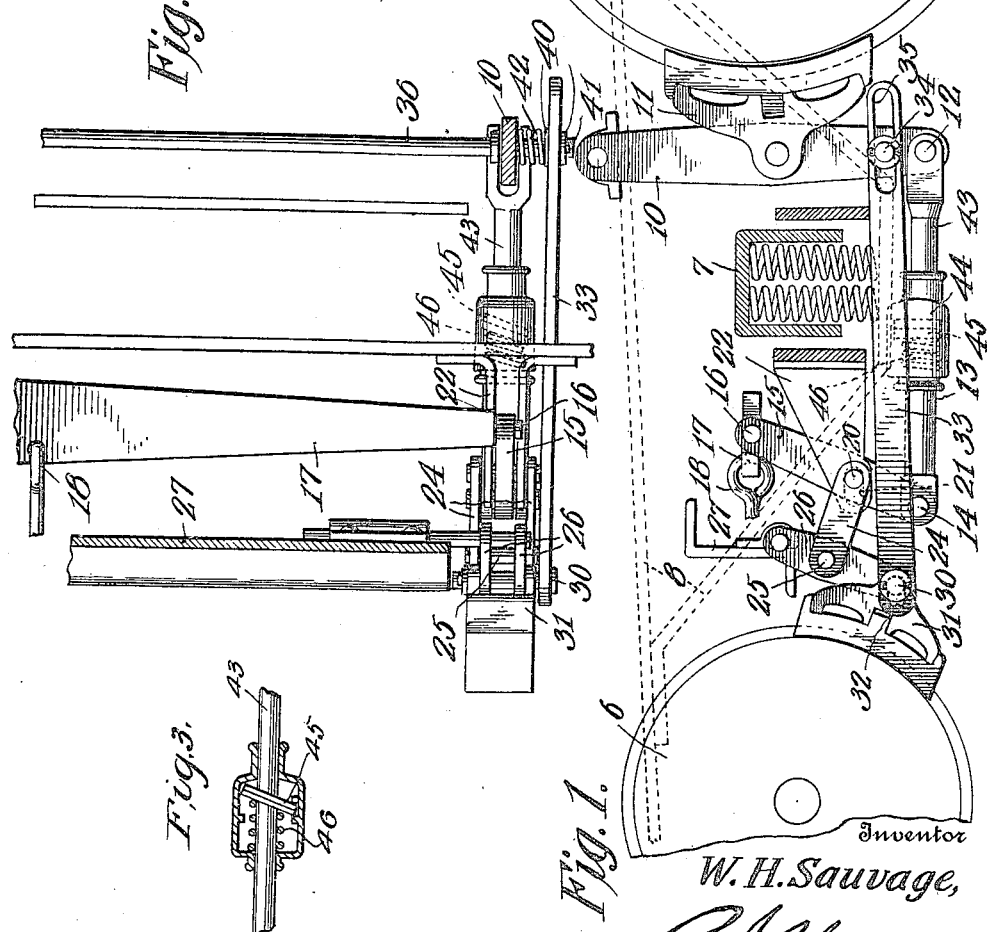
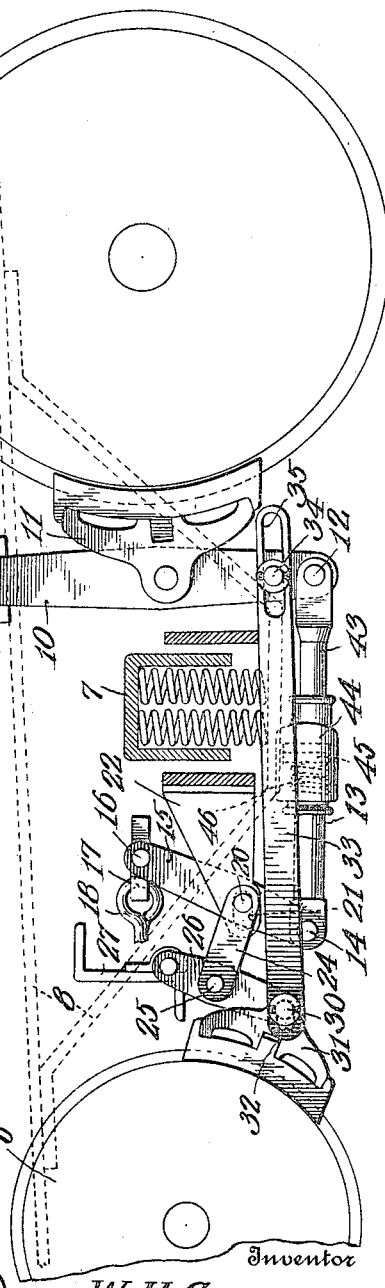
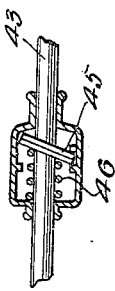
Inventor
W. H. Sauvage,
By
Attorney

UNITED STATES PATENT OFFICE.

WILLIAM H. SAUVAGE, OF FLUSHING, NEW YORK, ASSIGNOR TO GOULD COUPLER COMPANY, A CORPORATION OF NEW YORK.

SLACK-ADJUSTER.

1,227,946.   Specification of Letters Patent.   Patented May 29, 1917.

Application filed January 25, 1916. Serial No. 74,182.

*To all whom it may concern:*

Be it known that I, WILLIAM H. SAUVAGE, citizen of the United States, and resident of Flushing, Long Island, in the county of Queens and State of New York, have invented certain new and useful Improvements in Slack-Adjusters, of which the following is a specification.

This invention relates to slack adjusters for the brake rigging of railway cars, and in its more intense aspect to a slack adjuster particularly adapted for use with what may be termed maximum traction trucks. One of the objects of the present invention is to provide a reliable and efficient slack adjuster mechanism of the above general type. A further object is to provide a slack adjuster for maximum traction trucks having relatively few parts which will be cheap to manufacture and install. A further object is to provide a simple and practical automatic slack adjuster adapted to maintain uniform piston travel.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:

Figure 1 is a side elevation of a maximum traction truck showing such parts of the truck and brake rigging as are necessary to fully understand the present invention.

Fig. 2 is a plan view showing one part of the truck brake rigging.

Fig. 3 is a detail sectional plan view of the permanent take up and holding mechanism.

Referring now to the drawings in detail and more particularly to Fig. 1, 5 denotes the larger wheel of a maximum traction truck and is located usually at the extreme front and extreme rear of a two-truck car. The smaller wheels 6 of each truck are adjacent the middle of the car. A truck bolster 7, provided with the usual frame work 8, maintains these wheels in proper relative position. Other truck frame work hereinafter referred to in detail is also included and is adapted to support various parts of the brake mechanism.

The brake rigging includes a dead lever 10 secured at it upper end to a relatively fixed bracket and is provided with a brake shoe head 11 pivotally connected thereto near its middle while its lower end is pivotally connected at the point 12 to one end of a two-part extensible push rod 13. The opposite end of this push rod is pivotally connected at 14 to the lower end of the live lever 15, the upper end of which is pivotally connected at 16 to an equalizer brake beam 17. It is, of course, to be understood that this mechanism is applied to each side of the truck as shown more clearly in Fig. 2 and the central part of the beam 17 is connected at the point 18 with the brake actuating mechanism such, for example, a cylinder, (not shown), beneath the car.

This live lever 15 is provided with a pin 20 traveling in a slot 21 in a supporting member 22 forming a relatively fixed part of the truck frame. A link 24 extends to one side and is pivotally connected at 25 to the central part of a link 26, the upper end of which is attached to a transverse fixed member 27 while the lower end is pivotally connected at the point 30 to a brake shoe head 31 carrying a shoe coacting with the small wheel 6. This pivotal connection 30 also supports the automatic adjusting rod 33, having a lost motion slot 32 near its end and the opposite end of which rod is connected at the point 34 to the lower part of the dead lever 10. At this point the rod 33 is provided with a slot 35 taking over the end of a transverse tie rod 36, Fig. 2, and is provided with a spring actuated friction clamp device 37 of any desired type, but preferably that shown more clearly in Fig. 2 as the same is believed to possess certain advantages which will hereinafter be explained.

This frictional adjusting device comprises washers 40 at each side, one of which is held in place by a cotter pin 41 and the other engaged by a coiled spring 42 reacting against the side of the dead lever 10. These parts engage the rod with sufficient friction to permit a yielding movement of the rod therethrough under abnormal circumstances, but normally to permit a slipping of the rod in one direction only exactly equal to the excess or false travel of the brake rigging due to excess wear of the parts.

The automatic extensible push rod 13 connecting the lower ends of the live and dead levers may be of any desired type, but it is preferred to construct these parts in the form of two telescopic members, one being a relatively solid rod 13 connected with the lower end of the dead lever 10 and engaging a hollow casting 43 connected with the lower end of the live lever 15. This casting is provided with a housing 44 containing one or more rectangular perforated dogs 45 through which the push rod 13 passes. The openings in the dogs are preferably case hardened and conform in shape to the cross section of the rod 13 passing therethrough. These dogs are normally held in canted position by means of spring 46, as shown. The parts of this take up and holding mechanism are so positioned and arranged as to coact with the effective ends of the parts 13 and 43 and permit a relative expansion in one direction, yet positively take up and hold the thrust when the brakes are applied.

In operation these slack adjuster mechanisms which are at opposite sides of the truck operate in substantially the following manner. The brake beam 17 moves toward the left under the action of the brake cylinder and transmits its power through link 24 to the brake shoe hanger 26 forcing the brake shoe into contact with the smaller wheel. Reaction of course takes place and the extensible push rod at the bottom connecting the lower ends of the live and dead levers carries the brake shoe adjacent the dead lever into contact with the periphery of the larger wheel. If excess travel takes place, there will be a slipping of the adjusting rod 33 through the friction clamp device at the lower end of the dead lever an amount exactly equal to the excess travel, thus permitting the brake shoes to remain in contact with the wheels.

On release of the brakes the shoes first drop away from the periphery of the wheels by reason of the lost motion slot 32 and as the live lever returns to normal position under the action of the usual return spring (not shown) the friction clamp 41 will hold temporarily with sufficient friction to move the plunger 13 out of the casting 43 a corresponding distance and the dogs will permanently hold the parts in their newly adjusted condition. This operation is repeated from time to time as circumstances may demand due to the wear of the parts and thus insure a predetermined piston travel at all times.

It is thus seen that the present invention provides a simple and practical slack adjuster mechanism particularly adapted for maximum traction trucks and one which is adapted to accomplish, among others, all of the objects and advantages above set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a slack adjuster, in combination, a member carrying a live lever, a dead lever supported from the truck, an extensible push rod connecting said levers, a brake shoe hanger, connections between the hanger and the live lever, and an adjusting rod between the hanger and the dead lever.

2. In a slack adjuster, in combination, a member carrying a live lever, a dead lever supported from the truck, a push rod connecting said levers, a brake shoe hanger, connections between the hanger and the live lever, an adjusting rod between the hanger and the dead lever, and temporary holding means associated with one of said parts adapted to actuate the push rod on release of the brakes.

3. In a slack adjuster, in combination, an actuating member, a live lever carried thereby and supported intermediate its ends from a relatively fixed part of the truck, a dead lever at the opposite side of the truck bolster, an extensible push rod connecting the lower ends of said levers, a brake shoe hanger substantially parallel to the live lever and connected thereto, brake shoes carried by the hanger and dead lever, an adjusting rod connecting the hanger and the dead lever, a lost motion connection at one point of connection, and a friction take up device at the other point of connection whereby the extensible push rod is actuated to permanently take up and hold the excess travel on release of the brakes.

4. In a slack adjuster, in combination, a live lever supported intermediate its ends from a relatively fixed part of the truck, a dead lever, an extensible push rod connecting said levers, a brake shoe hanger substantially parallel to the live lever and connected thereto, brake shoes carried by the hanger and dead lever, an adjusting rod connecting the hanger and the dead lever, a lost motion connection at one point of connection and a friction take up device at the other point of connection whereby the extensible push rod is actuated to permanently take up and hold the excess travel on release of the brakes, said extensible push rod including two telescopic members, a housing on one of said members, and a dog in said housing coacting with the other.

5. In a slack adjuster, in combination, a live lever connected with the brake actuating mechanism, a dead lever supported from a relatively fixed part of the truck, an extensible push rod connecting the levers, a brake shoe hanger adjacent and substantially parallel to the live lever, a link connecting the live lever and hanger near their central parts, an adjusting rod connecting the lower part of said hanger with a point near the lower end of said dead lever, a lost motion connection between said hanger and adjusting rod and a frictional connection between the adjusting rod and the dead lever adapted to temporarily take up and hold the excess travel of the brake rigging until the push rod can be actuated permanently to hold the same on release of the brakes.

6. In a slack adjuster, in combination, a live lever supported near its middle from a relatively fixed part of the truck, a dead lever supported at its upper end from a relatively fixed part of the truck, a brake shoe pivotally connected therewith near its central part, an extensible telescopic push rod connecting the lower ends of said levers adapted to permanently take up and hold the excess travel of the brake rigging, a brake shoe hanger parallel to one of said levers, a link connecting the central part of said hanger with the central part of the adjacent lever, an adjusting rod connecting the lower end of the hanger with the lower part of the other lever, and a lost motion device associated with one of the points of connection.

7. In a slack adjuster, in combination, a live lever, a dead lever, a brake shoe pivotally connected therewith, a telescopic push rod connecting the lower ends of said levers adapted to permanently take up and hold the excess travel of the brake rigging, a brake shoe hanger parallel to one of said levers, a link connecting the central part of said hanger with the central part of the adjacent lever, an adjusting rod connecting the lower end of the hanger with the lower part of the other lever, a lost motion device associated with the brake shoe hanger, and a friction clamp associated with its other point of connection.

8. In a slack adjuster, in combination, a live lever, a dead lever, a brake shoe pivotally connected near its central part, a telescopic push rod connecting the lower ends of said levers adapted to permanently take up and hold the excess travel of the brake rigging, a brake shoe hanger parallel to one of said levers, a link connecting said hanger with the adjacent lever, an adjusting rod connecting one end of the hanger with the lower part of the other lever, a lost motion device associated with the brake shoe hanger, and a friction clamp associated with its other point of connection, said friction clamp comprising a pair of washers engaging opposite sides of the adjusting rod, and a spring for holding said washers in frictional engagement therewith.

9. In a slack adjuster, in combination, a live lever connected with the brake beam at its upper end and supported near its middle to a relatively fixed part of the truck, a dead lever supported at its upper end to a relatively fixed part of the truck, a brake shoe pivotally connected near its central part, an extensible telescopic push rod connecting the lower ends of said levers adapted to permanently take up and hold the excess travel of the brake rigging, a brake shoe hanger parallel to one of said levers, a link connecting the central part of said hanger with the central part of the adjacent lever, an adjusting rod connecting the lower end of the hanger with the lower part of the other lever, a lost motion device associated with the brake shoe hanger, and a friction clamp associated with its other point of connection, said friction clamp comprising a pair of washers engaging opposite sides of the adjusting rod, and a spring for holding said washers in frictional engagement therewith.

10. In a slack adjuster, in combination, a member carrying a live lever, a dead lever supported from the truck, a two-part push rod connecting said levers, a brake shoe hanger, connections between the hanger and the live lever, and an adjusting rod between the hanger and the lever having a lost motion slot near one point of connection, and a temporary friction holding member at the other, thereby to insure uniform brake shoe clearance and actuate the two parts of the push rod to take up the slack when excess travel has occurred.

Signed at New York in the county of New York and State of New York this 16th day of December A. D. 1915.

WILLIAM H. SAUVAGE.